United States Patent
Jo (10) Patent No.: US 8,860,967 B2
(45) Date of Patent: Oct. 14, 2014

(54) SCANNER DEVICE AND MULTIFUNCTION APPARATUS WITH SUPPLY PATH, DISCHARGE PATH, AND RE-SUPPLY PATH INTEGRALLY FORMED TOGETHER

(75) Inventor: Yong-kon Jo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 54 days.

(21) Appl. No.: 13/547,768

(22) Filed: Jul. 12, 2012

(65) Prior Publication Data

US 2013/0016384 A1    Jan. 17, 2013

(30) Foreign Application Priority Data

Jul. 13, 2011    (KR) .................. 10-2011-0069497

(51) Int. Cl.
- *G06K 15/02*    (2006.01)
- *H04N 1/04*    (2006.01)
- *B65H 85/00*    (2006.01)
- *H04N 1/00*    (2006.01)

(52) U.S. Cl.
CPC .......... *H04N 1/00578* (2013.01); *B65H 85/00* (2013.01); *B65H 2301/33312* (2013.01); *B65H 2402/80* (2013.01); *H04N 1/0058* (2013.01); *B65H 2402/40* (2013.01)
USPC ........................ 358/1.13; 358/498; 358/497

(58) Field of Classification Search
CPC .................. H04N 1/00567–1/00572
USPC ......................... 358/1.13, 497, 498
See application file for complete search history.

(56) References Cited

U.S. PATENT DOCUMENTS

| | | | |
|---|---|---|---|
| 6,771,399 B1 * | 8/2004 | Batten | 358/497 |
| 2002/0135821 A1 | 9/2002 | Sekine | |
| 2005/0157357 A1 | 7/2005 | Yamanaka | |
| 2008/0225354 A1 | 9/2008 | Kim | |
| 2008/0231920 A1 | 9/2008 | Oh | |
| 2008/0239414 A1 * | 10/2008 | Misu | 358/498 |
| 2009/0166962 A1 * | 7/2009 | Osakabe et al. | 271/264 |
| 2010/0014902 A1 | 1/2010 | Tokutsu et al. | |
| 2011/0048263 A1 | 3/2011 | Shimoda et al. | |

FOREIGN PATENT DOCUMENTS

JP    2004-177820    6/2004

OTHER PUBLICATIONS

International Search Report and Written Opinion of the International Searching Authority mailed Sep. 19, 2012 in corresponding International Patent Application No. PCT/KR2012/001353.
Extended European Search Report dated Nov. 8, 2013 from European Patent Application No. 12156835.6, 8 pages.

* cited by examiner

*Primary Examiner* — Qian Yang
(74) *Attorney, Agent, or Firm* — Staas & Halsey LLP (57) ABSTRACT

A scanner device including: a scanning path on which a scanning member for scanning an image from a document is disposed; a supply path on which a document is supplied to the scanning path; a discharge path on which a document is discharged after scanning of the document on the scanning path has been completed; and a re-supply path that extended to the supply path from a intersection where the scanning path and the discharge path cross so that a document fed along the discharge path in a direction opposite to a document-feeding direction is re-supplied to the supply path after scanning of one side of the document has been completed, wherein one-side guide portions of the supply path, the discharge path, and the re-supply path are integrally formed.

18 Claims, 9 Drawing Sheets

SCANNER DEVICE AND MULTIFUNCTION APPARATUS WITH SUPPLY PATH, DISCHARGE PATH, AND RE-SUPPLY PATH INTEGRALLY FORMED TOGETHER

CROSS-REFERENCE TO RELATED APPLICATIONS

This application claims the benefit of Korean Patent Application No. 10-2011-0069497, filed on Jul. 13, 2011, in the Korean Intellectual Property Office, the disclosure of which is incorporated herein in its entirety by reference.

BACKGROUND

1. Field

The present invention relates to a scanner device that scans an image from a document and a multifunction apparatus including the same.

2. Description of the Related Art

Scanner devices irradiate light onto a document and receive light reflected from the document, thereby reading an image formed on the document. Scanner devices use scanning methods, such as a flatbed scanning method in which a document is put in a fixed position and an image is read when a scanning member, such as a contact type image sensor (CIS), a charge coupled device (CCD), or the like, is moved, a document-feeding scanning method in which a scanning member is disposed in a fixed position and a document is fed, and a composite scanning method thereof.

Scanner devices may be configured as a single device or a multifunction apparatus that is combined with a printer including a printing unit for printing an image on a sheet of paper, or combined with a copy machine.

Scanner devices include a plurality of components for forming a feed path on which a document is fed and for accommodating an actuator detecting the document and a sensor that is operable by the actuator. As a number of components for forming the feed path increases, the feed path may become less uniform, a document-feeding performance may be lowered, and assembling cost may be increased. In addition, as the length of connection lines for electrically connecting sensors and a control unit increases, manufacturing cost increases.

SUMMARY

Additional aspects and/or advantages will be set forth in part in the description which follows and, in part, will be apparent from the description, or may be learned by practice of the invention.

The embodiments of the present disclosure provides a scanner device that may reduce a document-feeding defect caused by an assembling error by reducing the number of components for forming a document-feeding path, and a multifunction apparatus including the scanner device.

The embodiments of the present disclosure also provides a scanner device that may reduce the length of connection lines for electrically connecting sensors and a control unit, and a multifunction apparatus including the scanner device.

According to an embodiment, there is provided a scanner device including: a scanning path on which a scanning member for scanning an image from a document is disposed; a supply path on which a document is supplied to the scanning path; a discharge path on which a document is discharged after scanning of the document on the scanning path has been completed; and a re-supply path that extended to the supply path from an intersection where the scanning path and the discharge path cross so that a document fed along the discharge path in a direction opposite to a document-feeding direction is re-supplied to the supply path after scanning of one side of the document has been completed, wherein one-side guide portions of the supply path, the discharge path, and the re-supply path are integrally formed.

The one-side guide portions of the supply path, the discharge path, and the re-supply path may be integrally formed by using injection molding.

The scanner device may further include an upper frame, a base frame, and a main frame interposed between the base frame and the upper frame. The main frame may be integrally formed with the one-side guide portions of the supply path, the discharge path, and the re-supply path by using plastic injection molding.

The one-side guide portions may include a lower supply guide portion, a lower discharge guide portion, and a lower re-supply guide portion forming lower guides of the supply path, the discharge path, and the re-supply path, respectively.

The upper frame may include an upper guide portion that faces the first re-supply guide portion and the first discharge guide portion and forms the re-supply path and the discharge path, and an upper supply guide portion that faces the lower supply guide portion and forms the supply path.

An end part of the lower re-supply guide portion that is directed towards the discharge path may be stepped from an end part of the lower discharge guide portion that is directed towards the re-supply path so that a document fed along the discharge path in a direction opposite to a document-feeding direction is guided to the re-supply path.

The scanner device may further include a pressing member for pressing a document against the scanning member. The pressing member may be disposed facing a scanning window in a position above the scanning member so that the document is secured in contact with the scanning window, and forms an upper guide of the scanning path.

The scanner device may further include at least one actuator that is rotated in contact with a fed document, and at least one document sensor for detecting rotation of the actuator and generating an electrical signal. The at least one document sensor may be disposed in a region outside of a document-feeding region in a widthwise direction of a document.

The scanner device may further include a control unit for controlling an operation of feeding a document. The control unit may be disposed in the region outside of the document-feeding region.

The scanner device may further include a main frame integrally formed with the one-side guide portions of the supply path, the discharge path, and the re-supply path by using plastic injection molding. At least one of the at least one document sensor may be disposed in a sidewall of the main frame in the region outside of the document-feeding region.

According to another aspect of the present disclosure, there is provided a multifunction apparatus including: the aforementioned scanner device; and a printing unit for printing an image on a sheet of paper.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

The present invention will now be described more fully with reference to the accompanying drawings, in which exemplary embodiments of the invention are shown.

Figure 1:
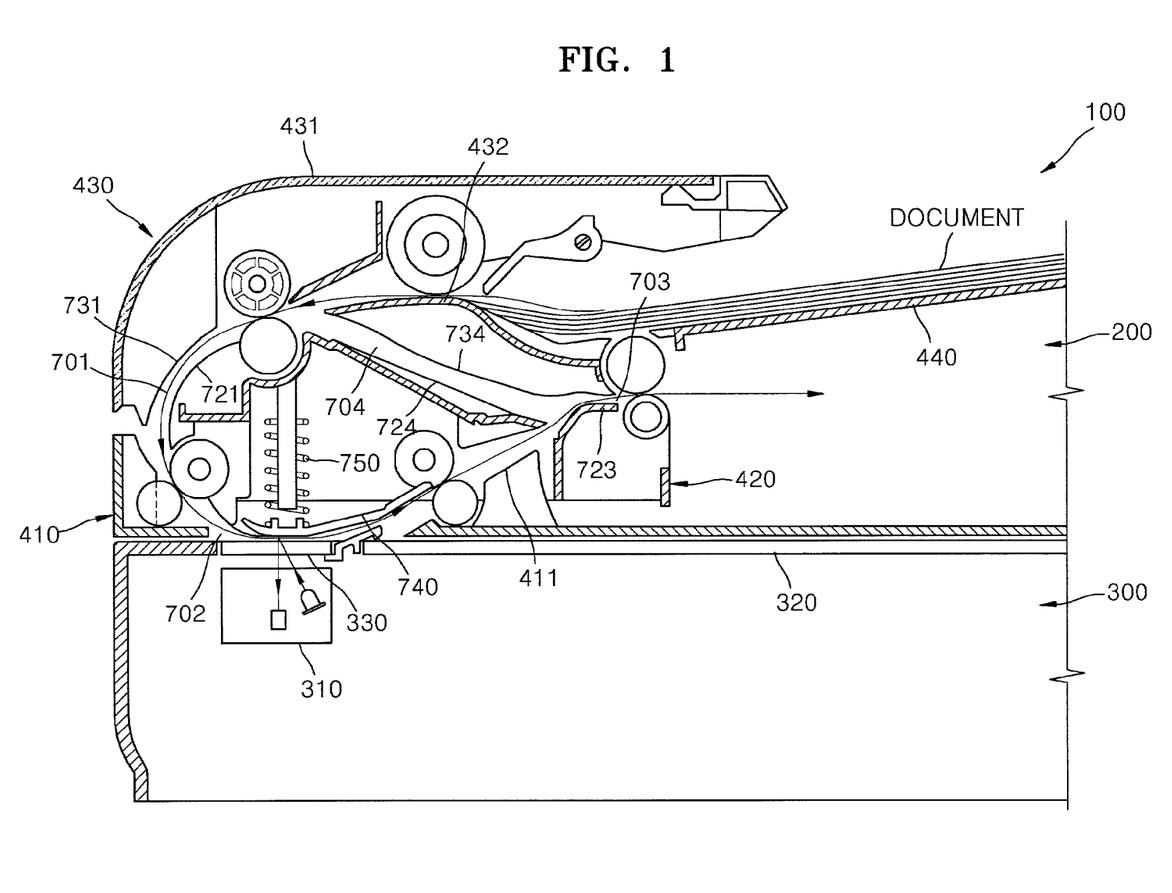
FIG. 1 is a cross-sectional view of a document-feeding path of a scanner device according to an embodiment of the present invention.

FIG. 1 is a cross-sectional view of a document-feeding path of a scanner device 100 according to an embodiment of the present invention. Referring to FIG. 1, the scanner device 100 may include an automatic feeding unit 200 and a scanning unit 300.

The scanning unit 300 includes a scanning member 310 for reading an image from a document. The scanning member 310 irradiates light onto the document and receives light reflected from the document, thereby reading the image formed on the document. The scanning member 310 may be a contact type image sensor (CIS), a charge coupled device (CCD), or the like.

The scanner device 100 illustrated in FIG. 1 uses a composite scanning method in which both a flatbed scanning method and a document-feeding scanning method are used. The scanning unit 300 further includes a platen glass 320 on which the document is disposed, so as to read the image from the document by using the flatbed scanning method. The scanning unit 300 further includes a scanning window 330 through which the image is read from the document by using the document-feeding scanning method. The scanning window 330 may be a transparent member, for example. The height of a top surface of the scanning window 330 may be the same as that of a top surface of the platen glass 320.

Figure 10:
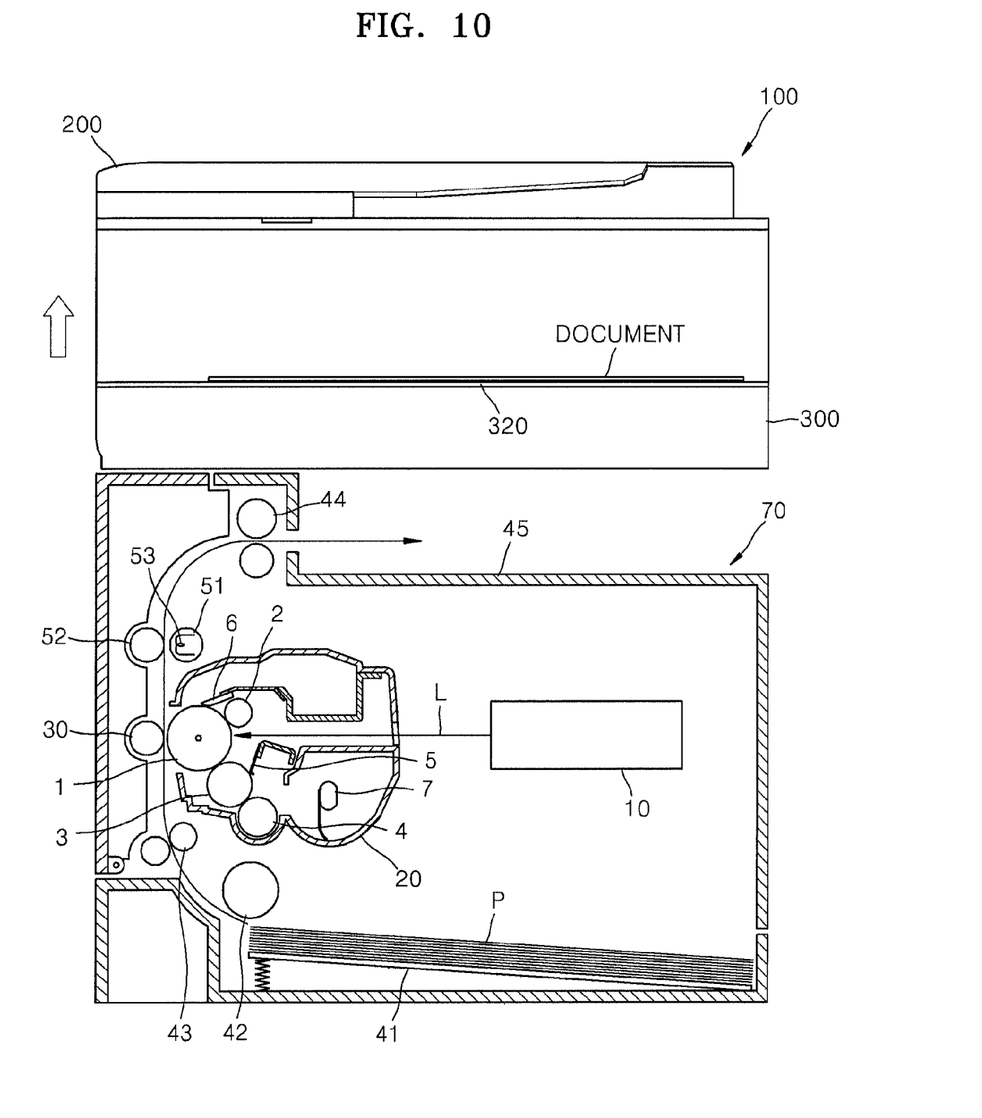
FIG. 10 is a cross-sectional view illustrating a state where an automatic document feeding unit is rotated so as to perform flatbed scanning by using the multifunction apparatus illustrated in FIG. 9.

When the document-feeding scanning method is used, the scanning member 310 is disposed under the scanning window 330. When the flatbed scanning method is used, the scanning member 310 may be moved by a movement unit (not shown) in an auxiliary scanning direction, i.e., in a lengthwise direction of the document, under the platen glass 320. In addition, when the flatbed scanning method is used, the automatic feeding unit 200 may be rotated with respect to the scanning unit 300, as illustrated in FIG. 10, so that the document may be put on the platen glass 320.

The automatic feeding unit 200 feeds the document so that the scanning member 310 may read the image formed on the document and discharges the document after the image has been scanned. Referring to FIG. 1, the automatic feeding unit 200 may include a scanning path 702 on which the image is scanned by the scanning member 310, a discharge path 703 on which the document is discharged after the image has been scanned, and a supply path 701 on which the document is supplied to the scanning path 702. In order to perform both-side scanning, the automatic feeding unit 200 may further include a re-supply path 704 for guiding the document fed along the discharge path 703 in a direction opposite to a document-feeding direction to the scanning path 702 after scanning of one side of the document has been completed.

Figure 2:
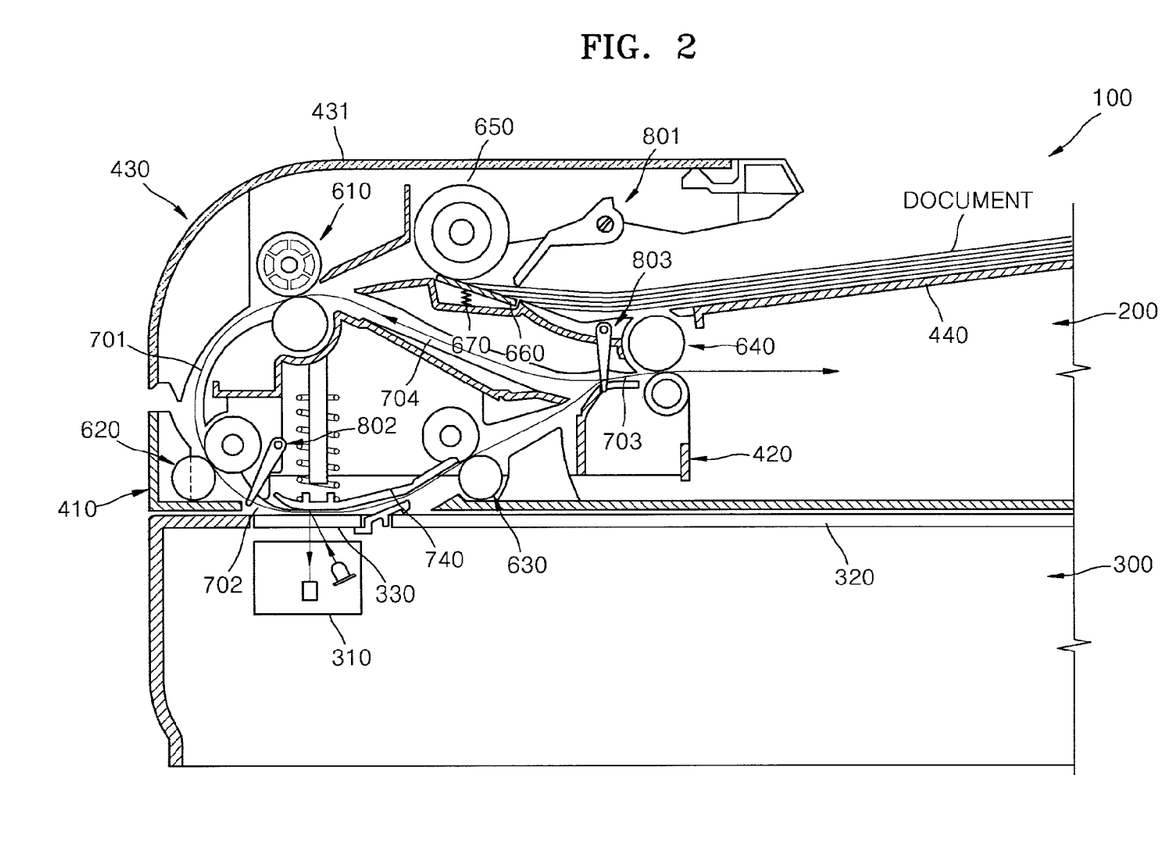
FIG. 2 is a cross-sectional view of a document-feeding unit and a document-detecting unit of the scanner device illustrated in FIG. 1.

Referring to FIG. 1, when one-side scanning is performed, the document is discharged in the order of the supply path 701, the scanning path 702, and the discharge path 703. Referring to FIG. 2, when both-side scanning is performed, before the document fed to the discharge path 703 is fully discharged after scanning of one side of the document has been completed, the document is fed along the discharge path 703 in the direction opposite to the document-feeding direction and passes through the scanning path 702 via the re-supply path 704 and the supply path 701. The document is discharged via the discharge path 703 after scanning of both sides of the document has been completed.

The automatic feeding unit 200 may include a base frame 410, an upper frame 430, and a main frame 420 interposed therebetween. The main frame 420 includes a lower re-supply guide portion (first re-supply guide portion) 724 that forms a lower guide of the re-supply path 704. The main frame 420 further includes a lower discharge guide portion (first discharge guide portion) 723 that forms a lower guide of the discharge path 703. The main frame 420 further includes a lower supply guide portion (first supply guide portion) 721 that forms a lower guide of the supply path 701.

The upper frame 430 includes an upper guide portion 734 that faces the lower re-supply guide portion 724 and the lower discharge guide portion 723 to form the re-supply path 704 and the discharge path 703. The upper frame 430 further includes an upper supply guide portion (second supply guide portion) 731 that faces the lower supply guide portion 721 to form the supply path 701.

Referring to FIG. 1, the upper frame 430 further includes an upper cover 431 that forms the exterior of the scanner device 100, and a guide frame 432 that is combined with a lower side of the upper cover 431. The upper guide portion 734 may have a plurality of rib shapes, for example, arranged on the guide frame 432 in a widthwise direction (depth direction in FIG. 1) of the document. The upper supply guide portion 731 may have a plurality of rib shapes arranged on the upper cover 431 in the widthwise direction (depth direction in FIG. 1) of the document.

The scanner device 100 further includes a document-feeding unit that feeds the document. Referring to FIG. 2, the document-feeding unit includes a supply portion 610 that feeds the document supplied from a loading stand 440 to the supply path 701, a main feeding portion 620 that is disposed between the supply path 701 and the scanning path 702 and feeds the document to the scanning path 702, an auxiliary feeding portion 630 that feeds the document passed through the scanning path 702 to the discharge path 703, and a discharge portion 640 that is installed on the discharge path 703 and discharges the document. The discharge portion 640 may feed the document in the direction opposite to the document-feeding direction, thereby feeding the document to the re-supply path 704. The document, after being passed through the re-supply path 704, is fed by the supply portion 610 to the supply path 701.

The supply portion 610, the main feeding portion 620, the auxiliary feeding portion 630, and the discharge portion 640 may each include a driving roller and a driven roller engaged to each other and rotated with respect to each other. The driving roller is a roller that is rotated due to power supplied by a power source (not shown), and the driven roller is a roller that is engaged with the driving roller and is rotated by the driving roller.

Figure 3:
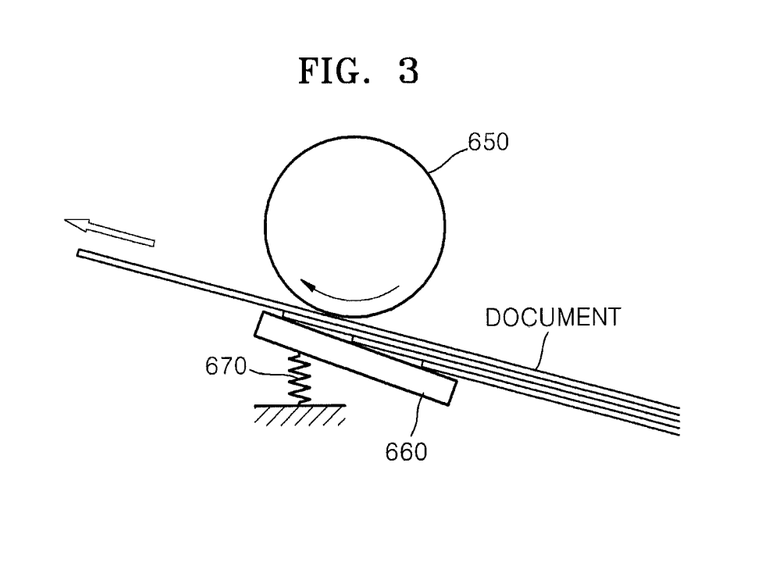
FIG. 3 illustrates an operation of separating a plurality of documents from one another by using an automatic document feeding (ADF) roller and a separation member of the scanner device of FIG. 1.

The automatic feeding unit 200 according to the current embodiment may perform automatic document feeding (ADF) in which one document is taken out from a plurality of documents and is supplied to the supply path 701. To perform this, as shown in FIGS. 2 and 3, the upper frame 430 may include an ADF roller 650 and a separation member 660 that faces the ADF roller 650. The separation member 660 may be elastically biased by an elastic member 670 towards the ADF roller 650. The ADF roller 650 and the separation member 660 may separate one document from the plurality of documents by using differences in frictional forces between the documents, the ADF roller 650, and between the documents and the separation member 660, for example. When the plurality of documents are put between the ADF roller 650 and the separation member 660, the frictional force between the documents is smaller than the frictional force between the ADF roller 650 and the documents and the frictional force between the separation member 660 and the documents. Thus, only a document that contacts the ADF roller 650 may be separated from the documents by being slid off the plurality of documents and fed by the supply portion 610 to the supply path 701.

Figure 4:
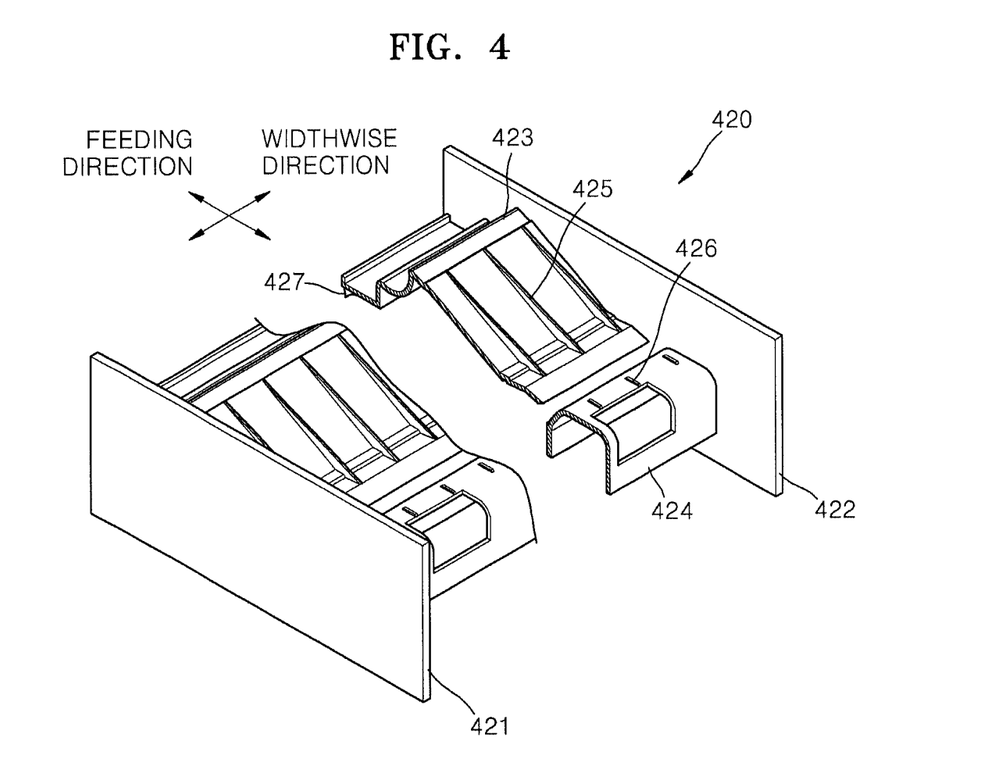
FIG. 4 is a perspective view of an example of a main frame of the scanner device of FIG. 1.

FIG. 4 is a perspective view of an example of the main frame 420. Referring to FIG. 4, the main frame 420 has an approximately H-shaped member including both sidewalls 421 and 422 and first and second connection portions 423 and 424 that connect the sidewalls 421 and 422 to each other and that extend in a horizontal direction, i.e., in the widthwise direction of the document. The main frame 420 may be manufactured by using plastic injection molding, for example. The first and second connection portions 423 and 424 are spaced apart from each other in the document-feeding direction, i.e. a direction perpendicular to the widthwise direction of the document.

For example, the lower re-supply guide portion (see 724 of FIG. 1) may be configured by an upper surface of the first connection portion 423. According to the current embodiment, a plurality of ribs 425 are arranged on the upper surface of the first connection portion 423 and protrude from the first connection portion 423 and are spaced apart from each other in the widthwise direction of the document. The lower re-supply guide portion 724 is configured by the plurality of ribs 425. Thus, a frictional force that may be generated between the first connection portion 423 and the document may be reduced due to the lower re-supply guide portion 724. For example, the lower discharge guide (see 723 of FIG. 1) may be configured by an upper surface of the second connection portion 424. According to the current embodiment, a plurality of ribs 426 are arranged on the upper surface of the second connection portion 424 and protrude from the second connection portion 424 and are spaced apart from each other in the widthwise direction of the document. The lower discharge guide 723 is configured by the plurality of ribs 426. The lower supply guide portion (see 721 of FIG. 1) may be configured by a plurality of ribs 427 that protrude from a bottom surface of the first connection portion 423 and are spaced apart from one another in the widthwise direction of the document.

Referring to FIG. 1, the scanning path 702 may be configured by the scanning window 330 disposed on the scanning unit 300, and a pressing member 740 that is disposed facing the scanning window 330 in a position above the scanning window 330. The pressing member 740 forms an upper guide of the scanning path 702. The pressing member 740 may be installed at the main frame 420. The pressing member 740 presses the document against the scanning member 310 so that the document may be secured in contact with the scanning window 330. The pressing member 740 is installed at the main frame 420 in a vertical direction. The pressing member 740 may press the document against the scanning member 310 due to the weight of the pressing member 740. In addition, an elastic member 750 may be disposed above the pressing member 740 so that the pressing member 740 presses the document against the scanning member 310. A surface of the pressing member 740 that faces the scanning member 310 may be white so as to provide a criterion for white balance of the scanning member 310. In addition, a white sheet (not shown) for providing the criterion for white balance may be attached to the surface of the pressing member 740 that faces the elastic member 750.

A discharge guide portion 411 is disposed on the base frame 410 so as to guide the document to the discharge path 703 after the document has passed through the scanning path 702.

As described above, in the scanner device 100 illustrated in FIG. 1, one-side guide portions 721, 723, and 724 of the supply path 701, the discharge path 703, and the re-supply path 704 are integrated with the main frame 420, and the other-side guide portions 731 and 734 of the supply path 701, the discharge path 703, and the re-supply path 704 are formed on the upper frame 430. According to this configuration, degrees of precision of positions of the supply path 701, the discharge path 703, and the re-supply path 704 and gaps of both guide portions of each of the supply path 701, the discharge path 703, and the re-supply path 704 depend on manufacturing errors of the upper frame 430 and the main frame 720 and an assembling error therebetween. Thus, the number of factors for determining the degrees of precision of the supply path 701, the discharge path 703, and the re-supply path 704 may be minimized. Thus, a document-feeding defect that is caused by the lowered degrees of precision of the supply path 701, the discharge path 703, and the re-supply path 704 may be reduced. In addition, the one-side guide portions 721, 723, and 724 of the supply path 701, the discharge path 703, and the re-supply path 704 are integrated with the main frame 420 and thus the number of components of the scanner device 100 may be reduced and material cost may be reduced.

Figure 5:
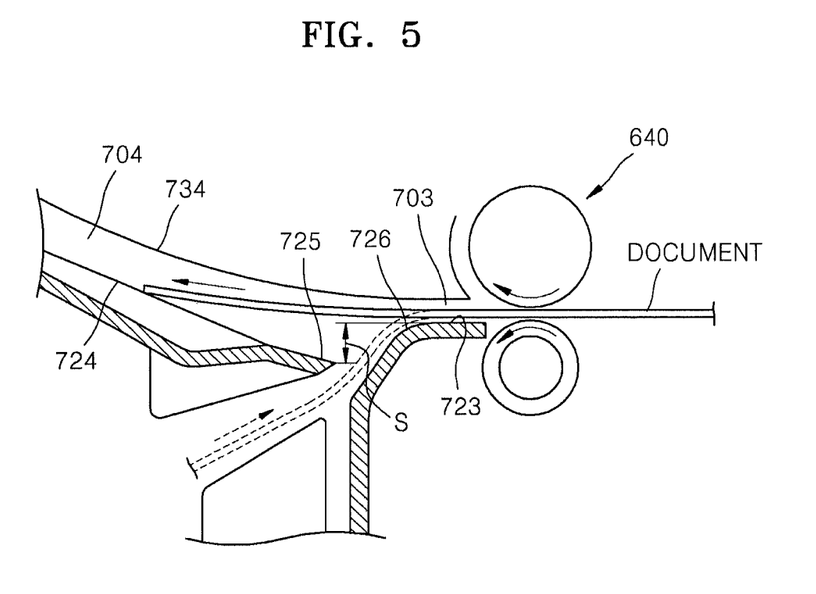
FIG. 5 illustrates an example of a structure for guiding a document onto a re-supply path so as to perform both-side scanning.

Referring to FIG. 5, an end part 725 of the lower re-supply guide portion 724 that is directed towards the discharge path 703 is stepped downward from an end part 726 of the lower discharge guide portion 723 that is directed towards the re-supply path 704. The document has predetermined rigidity. A rear end of the document remains straight due to the rigidity of the document as the document is being discharged along the discharge path 703 by the discharge portion 640. Thereafter, when the discharge portion 640 feeds the document in the direction opposite to the document-feeding direction, the document is not directed towards the scanning path 702 but is directed towards the re-supply path 704 due to a stepped amount S. According to this configuration, the document may be guided to the re-supply path 704 after being fed by the discharge portion 640 in the direction opposite to the document-feeding direction along the discharge path 703. Thus, an additional guide member for guiding the document discharged from the scanning path 702 to the discharge path 703 and guiding the document fed in the direction opposite to the document-feeding direction along the discharge path 703 to the re-supply path 704 is not required and thus material cost may be reduced and a document-feeding defect caused by an operational defect of the guide member may be prevented.

The scanner device 100 may further include a document-detecting unit that detects the existence and position of the document and whether the document has been discharged. For example, referring to FIG. 2, the scanner device 100 illustrated in FIG. 1 may include a first detector 801 that detects whether the document is loaded on the loading stand 440, a second detector 802 that detects whether the document is fed to the scanning path 702, and a third detector 803 that detects whether the document has been discharged via the discharge path 703.

Figure 6:
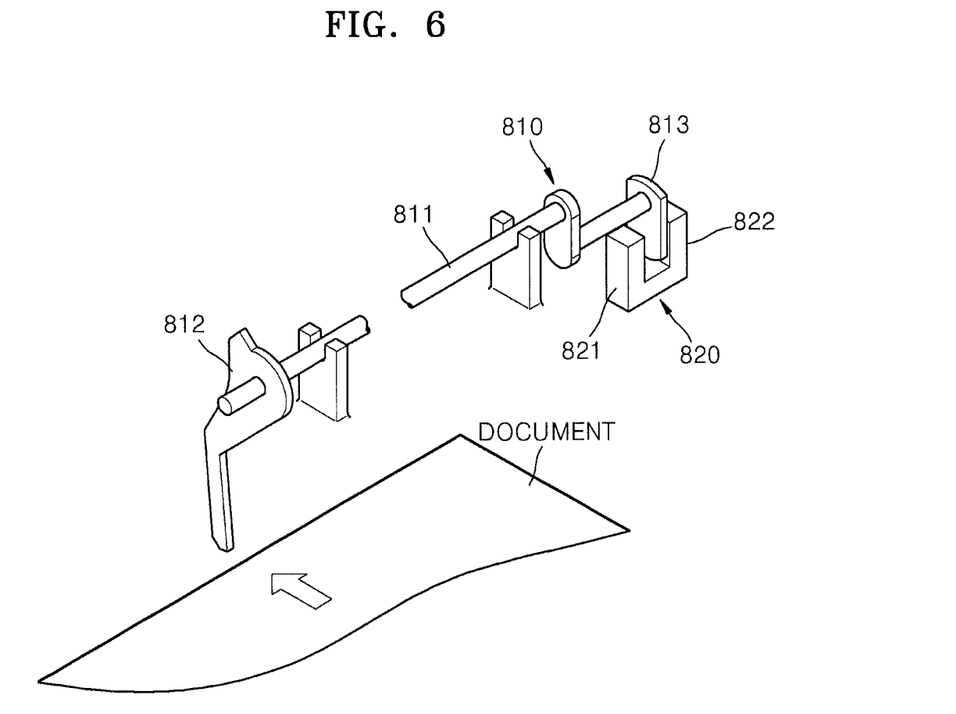
FIGS. 6 and 7 are perspective views of the document-detecting unit of FIG. 2.

FIG. 6 illustrates an example of the first detector 801. Referring to FIG. 6, the first detector 801 includes an actuator 810 that is mechanically operated by the document, and a document sensor 820 that detects whether the actuator 810 is operating and generates an electrical signal. The actuator 810 may be rotatably installed at the upper cover 431, for example. The actuator 810 may include a rotation shaft 811, an interference portion 812, and an operational portion 813. The rotation shaft 811 extends in the horizontal direction, i.e., the widthwise direction of the document, and is rotatably supported by the upper cover 431. The interference portion 812 extends in a downward direction from the rotation shaft 811 so as to interfere with the document loaded on the loading stand 440. The operational portion 813 extends from the rotation shaft 811 and allows the document sensor 820 to operate. For example, the document sensor 820 illustrated in FIG. 6 is a photointerruptor sensor including an emitter 821 and a photodetector 822. When an optical path between the emitter 821 and the photodetector 822 is interrupted by the operational portion 813, light is not detected by the photodetector 822, and when the operational portion 813 escapes from the optical path, light is detected by the photodetector 822. Thus, the document sensor 820 generates an off signal or an on signal according to the position of the operational portion 813. The on signal and the off signal may be signals having different voltage levels, for example. Alternatively, the document sensor 820 may have any of other shapes as long as the document sensor 820 operates due to the operational portion 813 and generates electrical signals having different voltage levels. For example, the document sensor 820 may be a micro-switch sensor that is turned on/off due by the operational portion 813.

Figure 7:
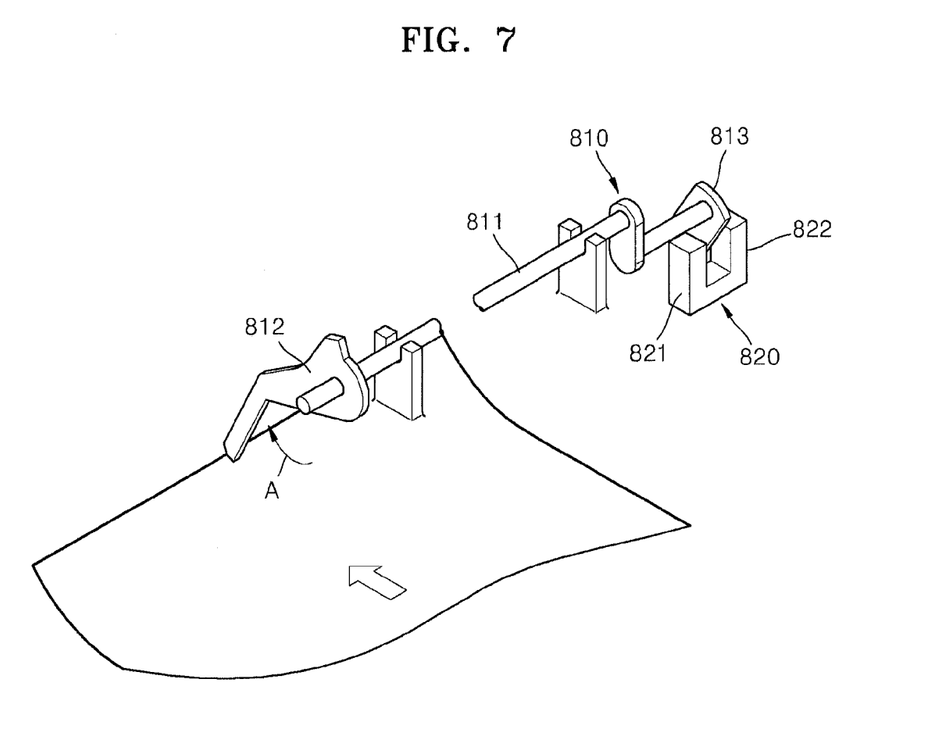

When the document is not loaded on the loading stand 440, the operational portion 813 interrupts the optical path. Thus, the document sensor 820 generates an off signal, for example. As illustrated in FIG. 7, when the document is loaded on the loading stand 440, the interference portion 812 is pushed by a front end of the document, and the actuator 810 is rotated around the rotation shaft 811 in a direction A. Then, the operational portion 813 escapes from the optical path of the document sensor 820. Thus, light is detected by the photodetector 822, and the document sensor 820 generates an on signal, for example. Thus, the document sensor 820 may detect whether the document is loaded on the loading stand 440.

The structure of the second detector 802 may be the same as that of FIGS. 6 and 7. The only difference therebetween is that the rotation shaft 811 is rotatably supported on a lower portion of the main frame 420 and the interference portion 812 is disposed across the scanning path 702 so as to interfere with the document fed to the scanning path 702. The front end of the document fed to the scanning path 702 may be detected by the second detector 802, and a scanning starting time may be determined by the scanning member 310.

The structure of the third detector 803 may also be the same as the structure of FIGS. 6 and 7. The only difference therebetween is that the rotation shaft 811 is rotatably supported on the guide frame 432 and the interference portion 812 is disposed across the discharge path 703 so as to interfere with the document fed to the discharge path 703. The rear end of the document fed to the scanning path 702 may be detected by the third detector 803, and the third detector 803 may determine whether the document has been discharged. In addition, after the rear end of the document is detected during both-side scanning, the document may be fed in the direction opposite to the document-feeding direction by using the discharge portion 640 and thereby may be fed to the re-supply path 704.

Figure 8:
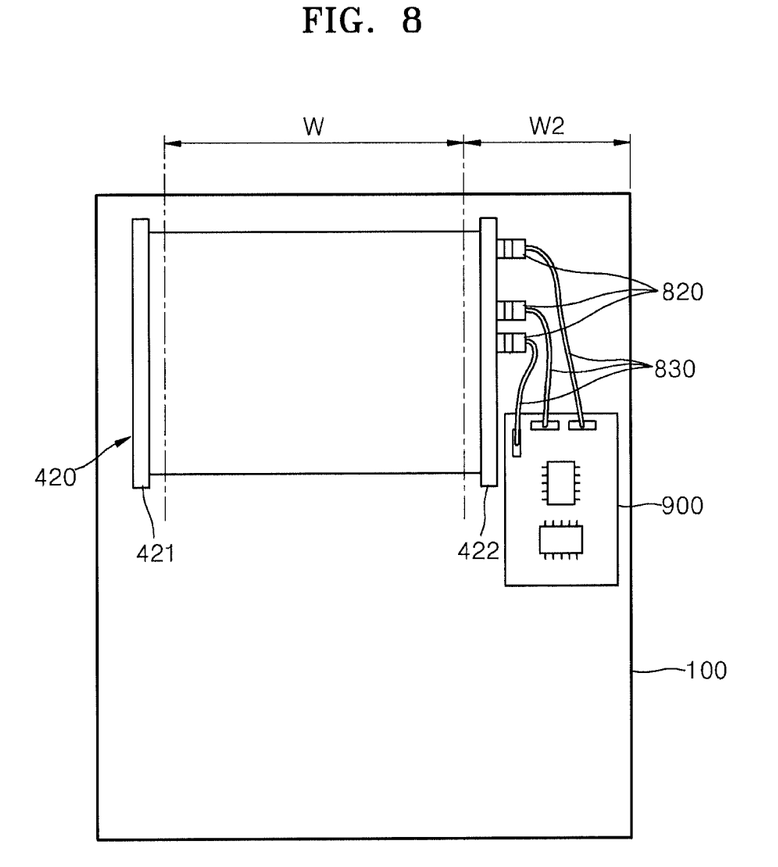
FIG. 8 is a plane view illustrating a position where a document sensor and a control unit are disposed.

As illustrated in FIGS. 6 and 7, the rotation shaft 811 of the actuator 810 extends in the widthwise direction of the document from the interference portion 812, and the operational portion 813 is disposed on an end part of the rotation shaft 811 opposite to the interference portion 812. FIG. 8 is a schematic plane view of the scanner device 100 illustrating a document-feeding region W and a position where the document sensor 820 is installed. The interference portion 812 needs to interfere with the document and thus is disposed in the document-feeding region W. The rotation shaft 811 extends in the widthwise direction of the document from the interference portion 812 up to a region W2 outside of the document-feeding region W, and the operational portion 813 is disposed on an end part of the rotation shaft 811. The document sensor 820 may be installed at the sidewall 422 of the main frame 420. According to this configuration, since a structure for installing the document sensor 820 is disposed outside the document-feeding region W, the structure of the main frame 420 and the upper frame 430 may be simplified. In other words, a structure that disturbs the document-feeding path may not be formed in portions of the main frame 420 and the upper frame 430 that correspond to the document-feeding region W and thus a document-feeding defect may be reduced.

FIG. 8 illustrates a control unit 900 that controls a document-feeding operation. The control unit 900 may be installed at the outer region W2. For example, the control unit 900 may be installed at the base frame 410. The document sensor 820 is electrically connected to the control unit 910 via connection lines 830. According to the scanner device 100 illustrated in FIG. 1, the structure for installing the document sensor 820 is disposed in the outer region W2 outside the paper feeding region W. Thus, since the connection lines 830 do not pass through the document-feeding region W, a structure for guiding the connection lines 830 does not need to be formed in the portions of the main frame 420 and the upper frame 430 that correspond to the document-feeding region W. Thus, the shapes of the main frame 420 and the upper frame 430 may be simplified, and a structure that disturbs the document-feeding path is not formed in the document-feeding region W and thus the document-feeding defect may be reduced. In addition, since the document sensor 820 is disposed in the outer region W2, a distance between the document sensor 820 and the control unit 900 is shorter than that in a case where the document sensor 820 is disposed in the document-feeding region W. Thus, the length of the connection lines 830 may be reduced. Thus, material cost may be reduced, and a process of arranging the connection lines 830 is simplified, and process cost may be reduced. In addition, since the connection lines 830 having a short length are used, a problem, such as electromagnetic interference or the like, may be reduced.

Figure 9:
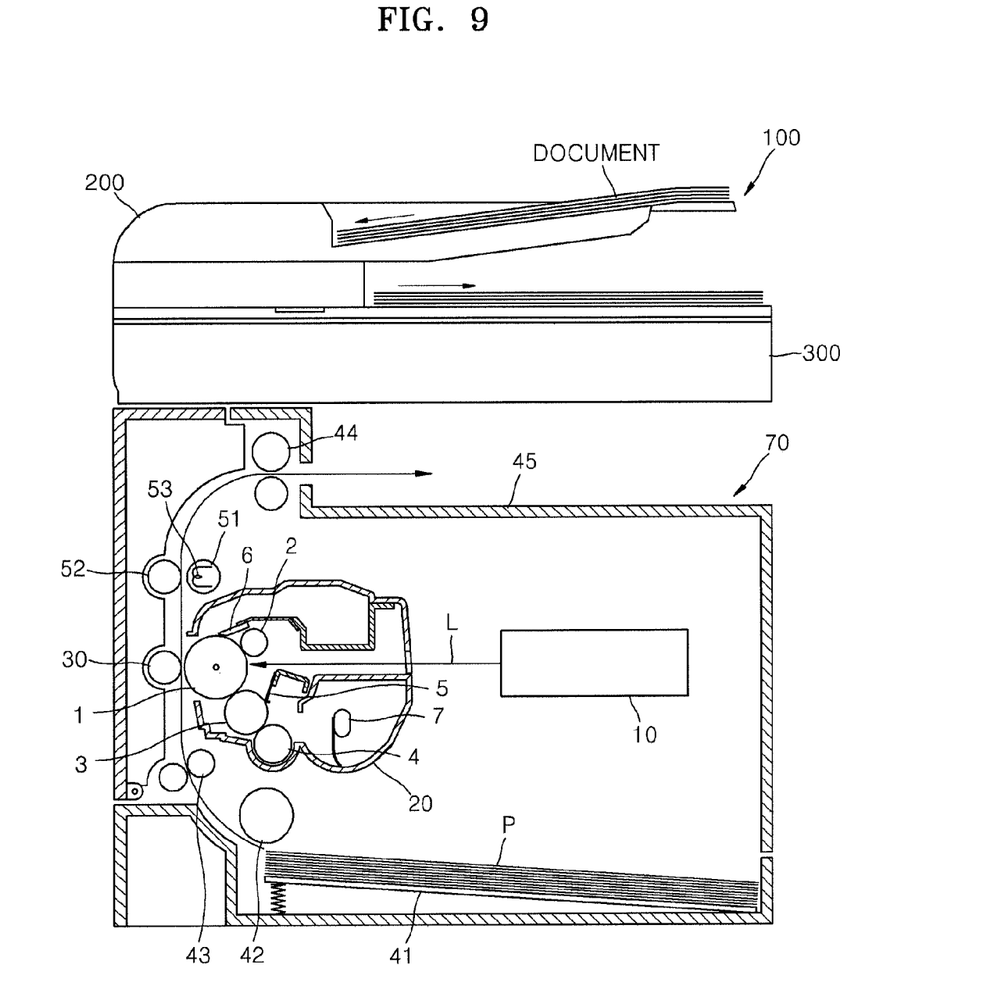
FIG. 9 is a cross-sectional view of a structure of a multi-function apparatus according to an embodiment of the present invention.

FIGS. 9 and 10 illustrate a structure of a multifunction apparatus according to an embodiment of the present invention. FIGS. 9 and 10 illustrate the scanner device 100 and a printing unit 70. The printing unit 70 according to the current embodiment is an electrophotography printing unit that prints an image on a sheet of paper by using electrophotography. The scanner device 100 is disposed above the printing unit 70. Hereinafter, an example of the printing unit 70 will be described.

A photosensitive drum 1, a charging roller 2, an exposure unit 10, a developing unit 20, and a transfer unit 30 are illustrated. The photosensitive drum 1 is an example of a photosensitive body on which an electrostatic latent image is formed. The photosensitive drum 1 is configured by forming a photosensitive layer having photoconductivity on a perimeter of a cylindrical metallic pipe. The charging roller 2 is an example of a charging unit that charges the surface of the photosensitive drum 1 to a uniform potential. A charging bias voltage is applied to the charging roller 2. A corona charging unit (not shown), instead of the charging roller 2, may also be used.

The exposure unit 10 scans light L that is modulated according to image information on the surface of the photosensitive drum 1 charged to the uniform potential, thereby forming an electrostatic latent image. A laser scanning unit (LSU) that scans light irradiated from a laser diode on the photosensitive drum 1, for example, by deflecting the light in a main scanning direction by using a polygonal mirror, may be used as the exposure unit 10.

The developing unit 20 develops the electrostatic latent image formed on the photosensitive drum 1 by supplying a toner to the electrostatic latent image. The toner is accommodated in the developing unit 20. The developing unit 20 includes a developing roller 3 that is used to develop the electrostatic latent image formed on the surface of the photosensitive drum 1 into a visual toner image by supplying the toner to the electrostatic latent image. In the current embodiment, a non-contact development method is used. The surface of the developing roller 3 is spaced apart from the surface of the photosensitive drum 1 by a distance of about several hundreds of microns. The distance is referred to as a development gap. When a development bias voltage is applied to the developing roller 3, the toner is moved to the electrostatic latent image formed on the surface of the photosensitive drum 1 via the development gap. When a contact development method is used, the developing roller 3 contacts the photosensitive drum 1. The developing unit 20 may further include a supply roller 4 that attaches the toner to the developing roller 3. A supply bias voltage may be applied to the supply roller 4 so as to attach the toner to the developing roller 3. Reference numeral 5 represents a regulation member that regulates the amount of the toner attached to the surface of the developing roller 3. The regulation member 5 may be a regulation blade of which a front end is attached to the developing roller 3 under a predetermined pressure, for example. Reference numeral 6 represents a cleaning member that removes the remaining toner and a foreign substance from the surface of the photosensitive drum 1 before charging. The cleaning member 6 may be a cleaning blade of which a front end contacts the surface of the photosensitive drum 1. An agitator 7 conveys the toner to the developing roller 3. The agitator 7 may agitate the toner and may charge the toner to a predetermined potential.

The transfer roller 30 is an example of a transfer unit that is disposed to face the surface of the photosensitive drum 1 and forms a transfer nip. A transfer bias voltage that is used to transfer the toner image developed on the surface of the photosensitive drum 1 onto a recording medium P is applied to the transfer roller 30. A coroner transfer unit, instead of the transfer roller 30, may also be used.

The recording medium P on which an image is to be printed is picked up by a pickup roller 42 from a paper-feeding cassette 41. The picked-up recording medium P is supplied by the transfer roller 43 to a region in which the transfer roller 30 and the photosensitive drum 1 face each other. Due to the transfer bias voltage applied to the transfer roller 130, the toner image on the photosensitive drum 1 is transferred onto the surface of the recording medium P and is maintained on the surface of the recording medium P due to an electrostatic attractive force.

A fusing unit 50 fuses the toner image on the recording medium P by heating and pressing the toner image, thereby forming a permanent printed image on the recording medium P. The fusing unit 50 may form a fusing nip when a heating roller 51 including a heating unit 53 and a pressing roller 52 are engaged with each other, as illustrated in FIG. 1. The recording medium P is discharged by a discharge roller 44 to a discharge tray 205 after the recording medium P has passed through the fusing unit 50.

According to the multifunction apparatus illustrated in FIGS. 9 and 10, printing, copying, and scanning operations may be performed. The printing operation is an operation in which an image is printed on a sheet of paper based on image information from an external host (not shown). The copying operation is an operation in which the image information is read from a document by using the scanner device 100 and is transmitted to the printing unit 70 in order to print the image on the sheet of paper. The scanning operation is an operation in which the image information is read from the document and the read image information is transmitted to the host (not shown), for example. When a communication unit (not shown) is disposed, a facsimile transmission function of transmitting the read image information by using a communication line, such as a telephone line or the like, and a facsimile receiving function of printing the image information received via the telephone line or the like by using the printing unit 70 may be performed.

In the above embodiment, a single-color electrophotography printing unit 70 including one developing unit 20 has been described. However, the present invention is not limited thereto. In case of a multi-color electrophotography printing unit, four developing units 20 in which cyan (C), magenta (M), yellow (Y), and black (K) color toners are accommodated, may be used. In addition, the printing unit 70 may use other image forming methods, such as an inkjet method, a thermal transfer method, and the like.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A scanner device comprising:
   a scanning path on which a scanning member for scanning an image from a document is disposed;
   a supply path on which a document is supplied to the scanning path;
   a discharge path on which a document is discharged after scanning of the document on the scanning path has been completed; and
   a re-supply path that extends to the supply path from an intersection where the scanning path and the discharge path cross so that a document fed along the discharge path in a direction opposite to a document-feeding direction is re-supplied to the supply path after scanning of one side of the document has been completed, wherein one-side guide portions disposed to guide the document along the supply path, the discharge path, and the re-supply path, are integrally formed together with a main frame by using injection molding.

2. The scanner device of claim 1, further comprising:
an upper frame; and
a base frame,
wherein the main frame is formed with two sidewalls which are interposed between the base frame and the upper frame, and the sidewalls are integrally formed together with the one-side guide portions by using injection molding,
wherein the main frame sidewalls are internally disposed within the scanner device.

3. The scanner device of claim 2, wherein the one-side guide portions comprises a lower supply guide portion, a lower discharge guide portion, and a lower re-supply guide portion forming lower guides of the supply path, the discharge path, and the re-supply path, respectively.

4. The scanner device of claim 3, wherein the upper frame comprises an upper guide portion that faces the lower re-supply guide portion and the lower discharge guide portion and forms the re-supply path and the discharge path, and an upper supply guide portion that faces the lower supply guide portion and forms the supply path.

5. The scanner device of claim 4, wherein an end part of the lower re-supply guide portion that is directed towards the discharge path is stepped from an end part of the lower discharge guide portion that is directed towards the re-supply path so that a document fed along the discharge path in a direction opposite to a document-feeding direction is guided to the re-supply path.

6. The scanner device of claim 1, further comprising:
a pressing member for pressing a document against the scanning member,
wherein the pressing member is disposed facing a scanning window in a position above the scanning member so that the document is secured in contact with the scanning window, and forms an upper guide of the scanning path.

7. The scanner device of claim 1, further comprising:
at least one actuator that is rotated in contact with a fed document; and
at least one document sensor for detecting rotation of the actuator and generating an electrical signal,
wherein the at least one document sensor is disposed in a region outside of a document-feeding region in a widthwise direction of a document.

8. The scanner device of claim 7, further comprising a control unit for controlling an operation of feeding a document, wherein the control unit is disposed in the region outside of the document-feeding region.

9. The scanner device of claim 7, wherein the main frame is integrally formed together with the one-side guide portions by using plastic injection molding,
wherein at least one of the at least one document sensor is disposed in a sidewall of the main frame in the region outside of the document-feeding region.

10. A multifunction apparatus comprising:
a printing unit for printing an image on a sheet of paper;
a scanner device comprising:
a scanning path on which a scanning member for scanning an image from a document is disposed;
a supply path on which a document is supplied to the scanning path;
a discharge path on which a document is discharged after scanning of the document on the scanning path has been completed; and
a re-supply path that extends to the supply path from an intersection where the scanning path and the discharge path cross so that a document fed along the discharge path in a direction opposite to a document-feeding direction is re-supplied to the supply path after scanning of one side of the document has been completed,
wherein one-side guide portions disposed to guide the document along the supply path, the discharge path, and the re-supply path, are integrally formed together with a main frame by using injection molding.

11. The multifunction apparatus of claim 10, further comprising:
an upper frame; and
a base frame,
wherein the main frame is formed with two sidewalls which are interposed between the base frame and the upper frame, and the sidewalls are integrally formed together with the one-side guide portions by using injection molding,
wherein the main frame sidewalls are internally disposed within the scanner device.

12. The multifunction apparatus of claim 11, wherein the one-side guide portions comprises a lower supply guide portion, a lower discharge guide portion, and a lower re-supply guide portion forming lower guides of the supply path, the discharge path, and the re-supply path, respectively.

13. The multifunction apparatus of claim 12, wherein the upper frame comprises an upper guide portion that faces the lower re-supply guide portion and the lower discharge guide portion and forms the re-supply path and the discharge path, and an upper supply guide portion that faces the lower supply guide portion and forms the supply path.

14. The multifunction apparatus of claim 13, wherein an end part of the lower re-supply guide portion that is directed towards the discharge path is stepped from an end part of the lower discharge guide portion that is directed towards the re-supply path so that a document fed along the discharge path in a direction opposite to a document-feeding direction is guided to the re-supply path.

15. The multifunction apparatus of claim 10, further comprising:
a pressing member for pressing a document against the scanning member,
wherein the pressing member is disposed facing a scanning window in a position above the scanning member so that the document is secured in contact with the scanning window, and forms an upper guide of the scanning path.

16. The multifunction apparatus of claim 10, further comprising:
at least one actuator that is rotated in contact with a fed document; and
at least one document sensor for detecting rotation of the actuator and generating an electrical signal,
wherein the at least one document sensor is disposed in a region outside of a document-feeding region in a widthwise direction of a document.

17. The multifunction apparatus of claim 16, further comprising a control unit for controlling an operation of feeding a document, wherein the control unit is disposed in the region outside of the document-feeding region.

18. The multifunction apparatus of claim 16, wherein the main frame is integrally formed together with the one-side guide portions by using plastic injection molding, wherein at least one of the at least one document sensor is disposed in a sidewall of the main frame in the region outside of the document-feeding region.

* * * * *